United States Patent
Lundberg et al.

(10) Patent No.: US 12,238,223 B2
(45) Date of Patent: Feb. 25, 2025

(54) DEVICE AND A METHOD FOR SIGNING A VIDEO SEGMENT COMPRISING ONE OR MORE GROUPS OF PICTURES

(71) Applicant: Axis AB, Lund (SE)

(72) Inventors: Stefan Lundberg, Lund (SE); Viktor Edpalm, Lund (SE)

(73) Assignee: Axis AB, Lund (SE)

( * ) Notice: Subject to any disclaimer, the term of this patent is extended or adjusted under 35 U.S.C. 154(b) by 288 days.

(21) Appl. No.: 17/710,151

(22) Filed: Mar. 31, 2022

(65) Prior Publication Data

US 2022/0368534 A1    Nov. 17, 2022

(30) Foreign Application Priority Data

May 11, 2021    (EP) .................................... 21173288

(51) Int. Cl.
  *H04L 9/32*    (2006.01)
  *H04N 21/835*    (2011.01)

(52) U.S. Cl.
  CPC .......... *H04L 9/3247* (2013.01); *H04L 9/3239* (2013.01); *H04N 21/835* (2013.01)

(58) Field of Classification Search
  CPC ... H04L 9/3247; H04L 9/3239; H04L 9/0643; H04L 63/123; H04L 69/22; H04L 9/0822; H04N 21/835; H04N 2005/91342; H04N 5/913; H04N 19/114; H04N 21/44209; H04N 21/8456; H04N 19/177; H04N 21/23476; H04N 19/467; H04N 21/44055; H04N 21/845
  See application file for complete search history.

(56) References Cited

U.S. PATENT DOCUMENTS

| | | | |
|---|---|---|---|
| 7,023,924 B1 * | 4/2006 | Keller | H04N 21/23424 375/240.26 |
| 9,253,530 B2 * | 2/2016 | Yoshioka | H04N 21/235 |
| 10,404,467 B1 * | 9/2019 | Winarski | H04L 9/3239 |
| 11,443,416 B2 * | 9/2022 | Liao | G06F 16/5854 |
| 2009/0208000 A1 * | 8/2009 | Yoshioka | H04N 7/1675 380/42 |
| 2010/0312908 A1 | 12/2010 | Yoshioka | |
| 2011/0078459 A1 | 3/2011 | Yoshioka et al. | |

(Continued)

OTHER PUBLICATIONS

Extended European Search Report dated Nov. 4, 2021 for European Patent Application No. 21173288.8.

(Continued)

*Primary Examiner* — Sm A Rahman
(74) *Attorney, Agent, or Firm* — Volpe Koenig

(57) ABSTRACT

A device, and method of signing a video segment comprising one or more groups of pictures, GOPs, wherein each GOP comprises a header and one or more frames, are disclosed. For each of the one or more GOPs a GOP hash is produced and the GOP hash is digitally signed by means of a digital signature to produce a signed GOP hash. For each GOP except a last GOP of the one or more GOPs the respective signed GOP hash is saved in the header of a subsequent GOP. An additional GOP is added to the video segment after the last GOP of the one or more GOPs, wherein the additional GOP comprising a header and one or more frames. The signed GOP hash of the last GOP of the one or more GOPs is saved in the header of the additional GOP.

19 Claims, 5 Drawing Sheets

(56) References Cited

U.S. PATENT DOCUMENTS

2015/0089019 A1* 3/2015 Chou .................. G06F 16/178
                                                    709/217
2016/0315987 A1* 10/2016 Yamagishi ....... H04N 21/64322
2020/0084022 A1   3/2020 Winarski
2020/0394181 A1  12/2020 Winarski

OTHER PUBLICATIONS

Zhao, Yifan et al. "Technique for authenticating H.264/SVC and its performance evaluation over wireless mobile networks." J. Comput. Syst. Sci. 80, 520-532 (2014).
Saadi, Karima Ait et al. "H.264/AVC video authentication based video content." 2010 5th International Symposium on I/V Communications and Mobile Network, 1-4 (2010).

* cited by examiner

DEVICE AND A METHOD FOR SIGNING A VIDEO SEGMENT COMPRISING ONE OR MORE GROUPS OF PICTURES

FIELD OF INVENTION

The present invention relates to authentication of content of a video segment, and specifically to signing a video segment comprising one or more groups of pictures (GOPs).

TECHNICAL BACKGROUND

In some applications it is desired to verify that the content of a video segment is intact, i.e., has not been tampered with after capturing of the video segment. Enabling such verification has become even more important in view of developments in video technology making it possible to produce manipulated videos of good quality. One way of enabling such verification for a video segment comprising one or more groups of pictures (GOPs) is to create authentication information for each GOP in the video and include the authentication information for each GOP in the video segment. The authentication information may then be used at a decoder side for verifying that the content of the one or more GOPs is intact. However, if authentication information for a GOP is missing in the video segment, it cannot be verified that the content of that GOP is intact, i.e., has not been tampered with.

SUMMARY

An object of the present disclosure is to facilitate enhancements to verification that a video segment comprising one or more groups of pictures (GOPs) is intact, i.e., has not been tampered with after capturing of the video segment.

According to a first aspect, a method for signing a video segment comprising one or more GOPs is provided. Each GOP comprises a header and one or more frames. For each GOP of the one or more GOPs, a GOP hash is produced, and the GOP hash is digitally signed by means of a digital signature, thereby producing a signed GOP hash for each GOP of the one or more GOPs. Furthermore, the respective signed GOP hash for each GOP except a last GOP of the one or more GOPs is saved in the header of a subsequent GOP of the one or more GOPs. An additional GOP is added to the video segment after the last GOP of the one or more GOPs. The additional GOP comprises a header and one or more frames. The signed GOP hash of the last GOP of the one or more GOPs is then saved in the header of the additional GOP.

By adding an additional GOP comprising a header to the video segment after the last GOP of the one or more GOPs, and saving the signed GOP hash of the last GOP of the one or more GOPs in the header of the additional GOP, it is ensured that a signed GOP hash of the last GOP of the one or more GOPs is included in the video segment. Hence, it will be possible to ensure that the content of the last GOP of the one or more GOPs has not been tampered with but is in fact identical to the content as hashed and signed.

By GOP hash is meant any value produced by means of hashing, or using any similar way of digesting, a content of the GOP.

By digitally signing the GOP hash by means of a digital signature is meant any way of verifying the authenticity of the GOP hash, such as for example by encryption of the GOP hash by means of a private key of a public/private key pair.

The one or more frames comprised in the additional GOP may be pre-encoded.

By using one or more pre-encoded frames in the additional GOP, no additional time and processing is required for encoding the one or more pre-encoded frames at the time of adding the additional GOP to the one or more GOPs of the video segment.

The additional GOP may comprise an empty intra frame and zero or more empty inter frames. An empty intra frame is a blank frame, and an empty inter frame is a frame referring to another frame and including no update in relation to the frame to which it refers. By including an empty intra frame and optionally one or more empty inter frames, the additional bits added to the video frame when adding the additional GOP is reduced in relation to adding non-empty frames.

The additional GOP may further include information indicating that the additional GOP is a last GOP of the video segment. Including information that the additional GOP is the last GOP, enables identification of the additional GOP at a decoder side. This is beneficial since it may then be determined at the decoder side that the previous GOP was the last GOP comprising verifiable content and that the additional GOP including the indication is only added to enable verification of the content of the previous GOP.

The GOP hash may be produced by producing a frame hash for each frame of the one or more frames of the GOP, thereby producing one or more frame hashes, and hashing the one or more frame hashes, thereby producing the GOP hash.

By hashing the one or more frame hashes to produce the GOP hash, only one hash needs to be checked to determine if the GOP has been tampered with.

Producing the GOP hash may further comprise hashing the one or more frame hashes with metadata comprising at least one of a unique identifier of a camera capturing the video segment and a time stamp for the video segment, thereby producing the GOP hash. The metadata may further comprise at least one of a hardware type (camera type), a firmware version a GPS position, a frame stamp, and a number of boots.

By hashing also metadata with the one or more frame hashes to produce the GOP hash, it may be determined whether or not the metadata has been tampered with.

The one or more frame hashes may further be concatenated with the GOP hash produced by hashing the one or more frame hashes, thereby producing a concatenated GOP hash. Digitally signing the GOP hash may the further comprise signing the concatenated GOP hash by means of a digital signature, thereby producing a signed GOP hash.

The one or more frame hashes of the signed GOP hash may then be used to identify which frame or frames have been tampered with if it is determined by means of the GOP hash that the GOP has been tampered with.

According to a second aspect, a non-transitory computer readable storage medium is provided having stored thereon instructions for implementing the method according to the first aspect, when executed on a device having processing capabilities.

The above-mentioned optional additional features of the method according to the first aspect, when applicable, apply to this second aspect as well. In order to avoid undue repetition, reference is made to the above.

According to a third aspect, a device for signing a video segment comprising one or more groups of pictures, GOPs, is provided. Each GOP comprises a header and one or more frames. The device comprises circuitry configured to execute a GOP hash producing function configured to produce a GOP hash for each GOP of the GOPs of the one or more GOPs; a GOP hash signing function configured to digitally sign the GOP hash for each GOP of the GOPs of the one or more GOPs, thereby producing a respective signed GOP hash for each GOP of the GOPs of the one or more GOPs; a GOP adding function configured to add an additional GOP to the video segment after the last GOP of the one or more GOPs, the additional GOP comprising a header and one or more frames; and a signed GOP hash saving function configured to, for each GOP of the one or more GOPs, save the respective signed GOP hash in the header of a subsequent GOP, wherein the signed GOP hash for the last GOP of the one or more GOPs is saved in the header of the additional GOP.

The above-mentioned optional additional features of the method according to the first aspect, when applicable, apply to this third aspect as well. In order to avoid undue repetition, reference is made to the above.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present disclosure will now be described in more detail, with reference to appended figures. The figures should not be considered limiting but are instead used for explaining and understanding.

DETAILED DESCRIPTION

Figure 1:
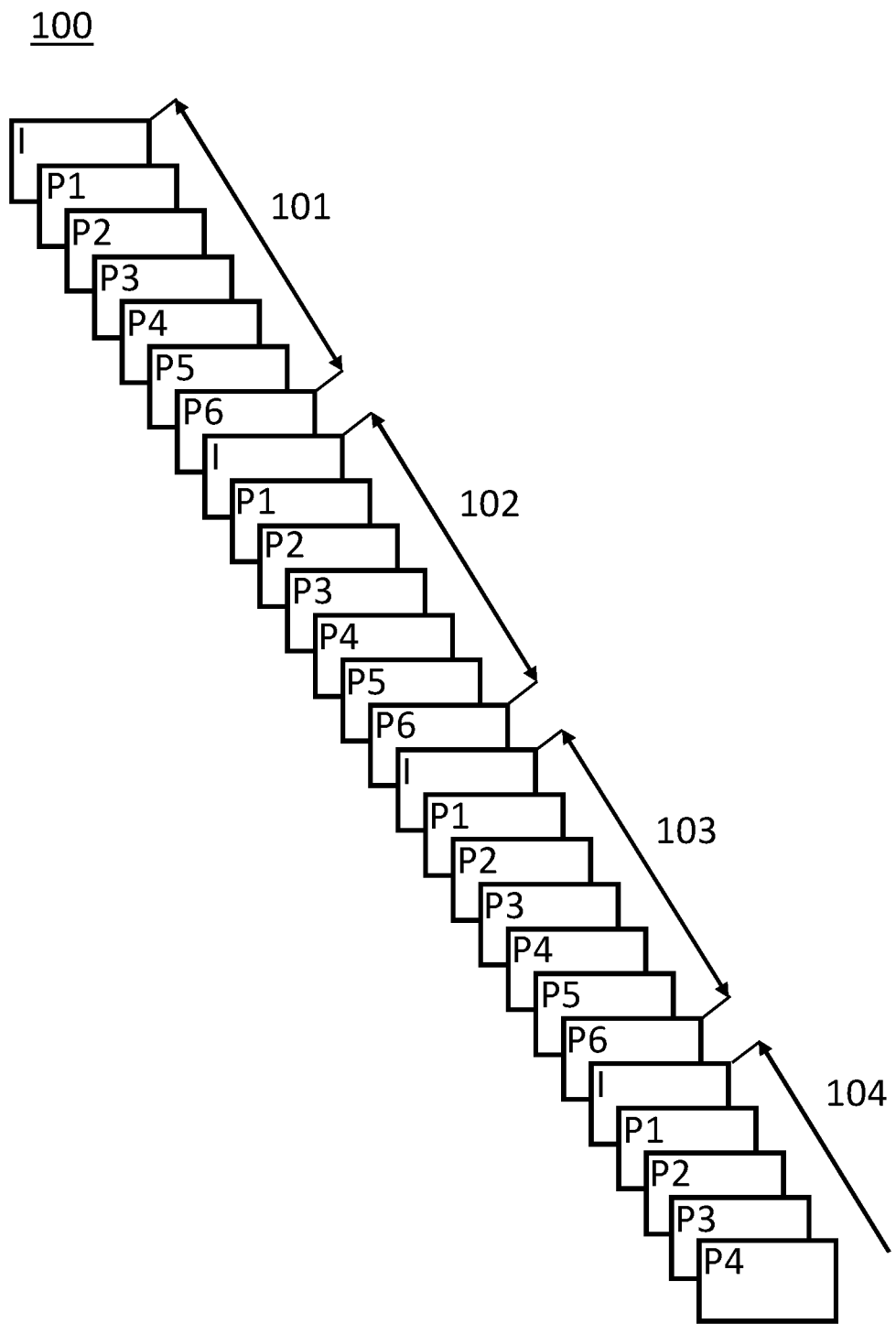
FIG. 1 shows an illustration of an example of a video segment including a number of groups of pictures (GOPs).
Figure 2:
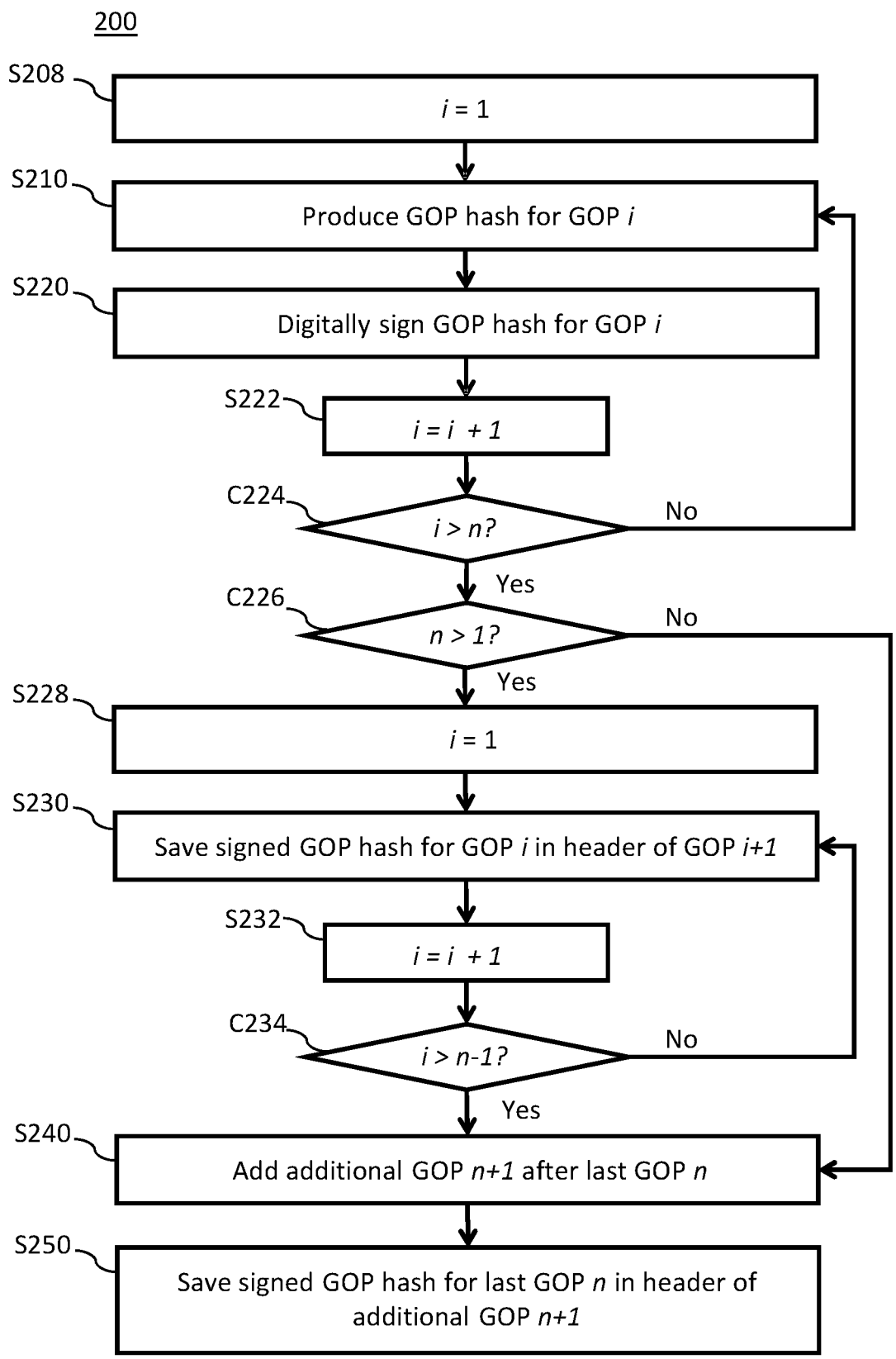
FIG. 2 shows a flow chart in relation to embodiments of a method of the present disclosure for signing a video segment comprising one or more GOPs.

The present disclosure will now be described hereinafter with reference to the accompanying drawings, in which currently preferred embodiments of the disclosure are illustrated. This disclosure may, however, be embodied in many different forms and should not be construed as limited to the embodiments set forth herein.

Embodiments of the disclosure may be used to ensure that the content of a video segment is intact, i.e., has not be tampered with after capturing of the video, in applications where a digitally signed GOP hash is created for each GOP in a video sequence and the digitally signed GOP hash for each GOP is included in a subsequent GOP in the video segment. At a decoder side the digital signature for the GOP can be used to verify the origin of the GOP. For example, if the digital signature for the GOP has been created by encryption of the GOP hash by means of a private key of a public/private key pair, the signature origin can be verified by decryption using the public key of the public/private key pair. Furthermore, a GOP hash can be produced from the content of the GOP as received at the decoder side and be compared to the (decrypted) digitally signed GOP hash. If they are equal, the content of the GOP is intact, and if they are not equal, the content of the GOP is not intact. Furthermore, for such applications, the digitally signed hash for a last GOP of the video sequence will not be included in the video sequence since there is no subsequent GOP in the video segment to the last GOP. Hence, it will not be possible to ensure that the content of the last GOP is intact, i.e., has not be tampered with after capturing. Furthermore, if the last GOP only includes a few frames before the end of the video segment, the amount of frames that cannot be verified to be intact of the last GOP is small. However, the time for producing a digitally signed GOP hash for the last but one GOP may be such that it cannot be included in the first few frames of the last GOP before the end of the video segment. Hence, in such a case, the signed GOP hash for the last but one GOP will also not be included in the video segment and the content of the last but one GOP cannot be verified to be intact either. In such a case, it may be ensured that a signed GOP hash for the last but one GOP is included in the last GOP. In alternative, a GOP hash for both the last but one GOP and the last GOP may be produced and included in an additional GOP.

Embodiments of the disclosure are advantageous when there is a risk that a substantial number of frames of a video segment is in a last GOP of the video segment. For example, if the end of the video segment is determined without taking into account an end of a last GOP of the video segment, a probability that the end of the video segment is after a given frame will be uniform over all frames in the last GOP. Hence, the larger the number of frames in each GOP, the higher the probability that a substantial number of frames of a video segment is in the last GOP of the video segment. One example where an end of a video segment may be determined without taking into account an end of a last GOP is when the video segment relates to a surveillance video, and where the video segment is started when a trigger becomes active and is ended when the trigger seizes to be active. In such an example, the video segment will end after a random position in relation to the end of a current GOP. Hence, with an increasing number of frames included in each GOP, the risk that a substantial part of the video segment is in the last GOP will increase. Furthermore, as the video segment is started and ended in relation to a trigger becoming active and seizing to be active, it is also likely that the last GOP of the video segment will include information of interest. The trigger, may be detection of motion, detection of a person/face, detection that a door is open, etc. If for example, the trigger is motion or a person/face in a video captured by a surveillance camera, the trigger may become active when a person appears moving towards the surveillance camera and seize being active when the person has passed the surveillance camera. In such a case, the face of the person will be closest to the surveillance camera just before the person passes the surveillance camera and the trigger seizes to be active, i.e., at the end of the video segment. Hence, the frames where the face is closest to the surveillance camera and likely easiest to identify may be in the last but one or last GOP of the video segment.

Embodiments of the disclosure are further advantageous when a video segment only comprises one GOP. In this case, the one GOP will also be the last GOP resulting in all frames of the video segment being in the last GOP of the video segment and if any frames include information of interest it will be in the last GOP.

FIG. 1 shows an illustration of an example of a video segment 100 including a number of GOPs 101-104 that may be used in relation to embodiments of the disclosure. Each GOP comprises a number of frames, wherein a first frame is an intra frame I followed by six inter frames P1-P6 in the first three GOPs 101-103 and by four inter frames P1-P4 in the last GOP 104 of the video segment. The video segment 100 may for example be a video segment 100 of which the end has been determined without taking into account an end of a last GOP. The first three GOPs 101-103 of the video segments are complete GOPs whereas the last GOP 104 may include only a subset of frames of a complete GOP. For example, the last GOP 104 of the video segment 100 comprises one intra frame I and four inter frames P1-P4. If the video segment would not have ended after the fourth inter frame P4, the GOP may have included further inter frames. The video segment 100 may for example relate to video frames captured by a video camera, such as a surveillance camera, a body worn camera or other, a subsequently encoded by an encoder.

It is to be noted that the video segment 100 of FIG. 1 is a simplified illustration. For example, the number of inter frames of each GOP may be more than illustrated, such as several hundred inter frames, and may differ between GOPs. Furthermore, the number of GOPs of a video segment may be more of less than the four GOPs 101-104 illustrated, depending on the length of the video segment and the length of each of the included GOPs. Furthermore, even if the examples disclosed relate mainly to P frames, the disclosure may be adapted and applied also to other types of inter coded frames, such as B frames, which may reference to more than one other frame.

Embodiments of a method 200 of signing a video segment comprising n GOPs, wherein n≥1 (i.e., one or more GOPs) and wherein each GOP comprises a header and one or more frames, will now be described in relation to FIGS. 1, 2, 3A and 3B. The method 200 comprises producing S210 a GOP hash for GOP i, and digitally signing S220 the GOP hash for GOP i by means of a digital signature, thereby producing a signed GOP hash for each GOP i=1 to n S208, S222, C224 (i.e., for each GOP of the n GOPs) of a video segment, such as the video segment of FIG. 1.

Figure 3A:
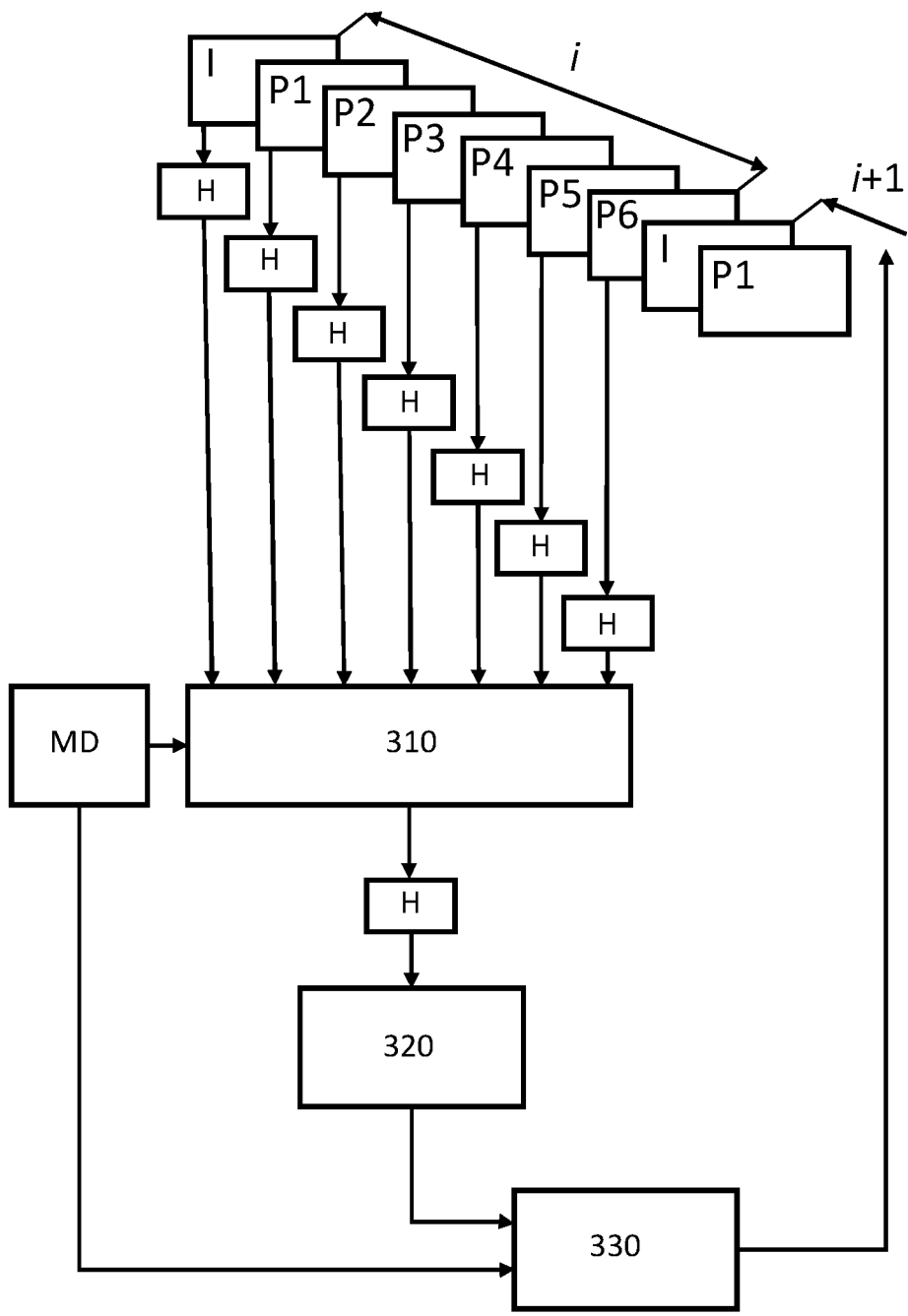
FIG. 3A shows an illustration of signing a GOP that is not a last GOP of a video segment according to embodiments of a method of the present disclosure.

Turning to FIG. 3A, the GOP hash for the GOP i may be based on frame hashes for the frames I, P1-P6 of the GOP i. A frame hash of a frame is produced using a hash function H on the content of the frame. Examples of mathematical hashing functions are identity hash, folding, division hashing, multiplicative hashing, Fibonacci hashing, and Zobrist hashing. Examples of cryptographic hash functions are MD5, SHA-1, SHA-2 (SHA-256/SHA-512), SHA-3, BLAKE-3. For example, the frame hashes for each of the frames I, P1-P6 may be concatenated 310 and in turn hashed, using a hash function H, to produce the GOP hash for the GOP i. Optionally, metadata MD may also be concatenated 310 with the frame hashes for each of the frames I, P1-P6 to produce the GOP hash for the GOP i. The metadata MD may comprise at least one of: a unique identifier of a camera capturing the video segment, a time stamp for the video segment, a hardware type (camera type), a firmware version, a GPS position, a frame stamp, and a number of boots. The GOP hash is then signed 320 using any type of digital signature enabling verification of origin of the GOP, e.g., using encryption of the GOP hash by means of a private key of a public/private key pair of a device, such as a camera, in which the method is performed. For examples, RSA (Rivest-Shamir-Adleman) 256-bit encryption, the Digital Signature Algorithm (DSA) and the Elliptic Curve Digital Signing Algorithm (ECDSA) may be used for digitally signing the GOP hash.

By producing the GOP hash for the GOP i using hashing of a concatenation of the one or more frame hashes for the frames I, P1-P6 of the GOP i, with or without the metadata MD, and then digitally signing 320 the GOP hash, verification that the content of the GOP i is intact, i.e., is untampered, can be made on a GOP level. In alternative, the one or more frame hashes of the GOP i may be concatenated (not shown in FIG. 3A) with the GOP hash for the GOP i to produce a concatenated GOP hash for the GOP i, and then the concatenated GOP hash is digitally signed 320 by means of a digital signature to produce a signed GOP hash. In this alternative, the part of the signed GOP hash relating to the GOP hash can be used to verify that the content of the GOP is intact, i.e., is untampered, on a GOP level. If it is shown that the GOP is not intact, the part of the signed GOP hash relating to the concatenated one or more frame hashes can be used to identify which frame of the one or more frame hashes has been tampered with by comparison to frame hashes produced from the content of the frames of the GOP at the decoder side.

Furthermore, a frame hash for the first frame I of the subsequent GOP i+1 may also be produced and added to the GOP hash for the GOP i before signing in order to enable identification of reordering of the GOPs and undetectable cuts. In alternative the GOP hash for the GOP i may be produced by hashing a concatenation of the frame hashes for the frames of the GOP i and the frame hash for the first frame I of the subsequent GOP i+1.

Turning back to FIG. 2, if the number n of GOPs is larger than 1 C226 (i.e., the first GOP is not the only GOP and hence not also the last GOP), the method further comprises, for each GOP i=1 to n−1 S228, S232, C234, i.e., for each GOP except the last GOP, saving S230 the signed GOP hash for the GOP i in the header of a subsequent GOP i+1.

Turning to FIG. 3A, the signed GOP hash for the GOP i is included 330 in a header of a subsequent GOP i+1. For example, the GOP hash may be included in a metadata frame (not shown) different from the frames I, P1-P6, of the GOP i show in FIG. 3A.

Turning back to FIG. 2, the method further comprises adding S240 an additional GOP n+1 to the video segment after the last GOP n of the n GOPs, wherein the additional GOP n+1 comprises a header and one or more frames. The signed GOP hash of the last GOP n of the n GOPs is then saved S250 in the header of the additional GOP n+1.

The additional GOP n+1 may be of any type as long as the GOP hash for the last GOP n is included. However, it is beneficial to keep the size of the GOP as small as possible in order to not unnecessarily increase the size of the video segment and to produce the additional GOP n+1 in such a way that the required processing and time for processing is kept low.

For example, the one or more frames comprised in the additional GOP may be pre-encoded. This means that the content of the one or more frames has been encoded in advance. By using one or more pre-coded frames, no additional time or resources will be required for encoding content when adding the additional GOP. Using one or more pre-coded frames in the additional GOP is possible since the additional frame is primarily intended to carry a signed hash of the last GOP n of the n GOPs. Hence, the content of the additional frame need not relate to content of the other GOPs of the video frame. Furthermore, since the additional GOP n+1 will not be followed by any further GOP, it will not be possible to include a signed GOP hash for the additional GOP in any subsequent GOP and hence, the content of the additional GOP cannot be verified as untampered.

Furthermore, the one or more frames of the additional GOP may be an empty intra frame and optionally one or more empty inter frames. An empty intra frame is a blank frame with only intra predictions and containing no encoded coefficients, and an empty inter frame is a frame referring to another frame and including no update in relation to the frame to which it refers. By including an empty intra frame and optionally one or more empty inter frames, the additional bits added to the video frame when adding the additional GOP is reduced in relation to adding non-empty frames.

The additional GOP may further include information indicating that the additional GOP is a last GOP of the video segment. Such information may for example be included as additional metadata in the header of the additional GOP that can be interpreted at a decoder to indicate that the additional GOP is a last GOP of the video segment. The additional metadata may further be used to indicate that the additional GOP is only to be used to verify the content of the previous GOP to be intact. In addition, or in the alternative, the information indicating that the additional GOP is a last GOP of the video segment may be included in the content of the additional GOP. For example, the additional GOP may be pre-encoded frames including content that after encoding and displaying will indicate that the GOP is the last GOP of the video segment, such as displaying text indicating that the GOP is the last GOP of the video segment. In alternative to include the additional metadata in the header, it may be encoded into video data of the additional GOP as a faint (basically invisible) "watermark", it may be added to out of frame encoded data, i.e., data after a frame is indicated to have ended and before a next frame is indicated to begin, or it can be added it to undefined network abstraction layers (NALs).

Figure 3B:
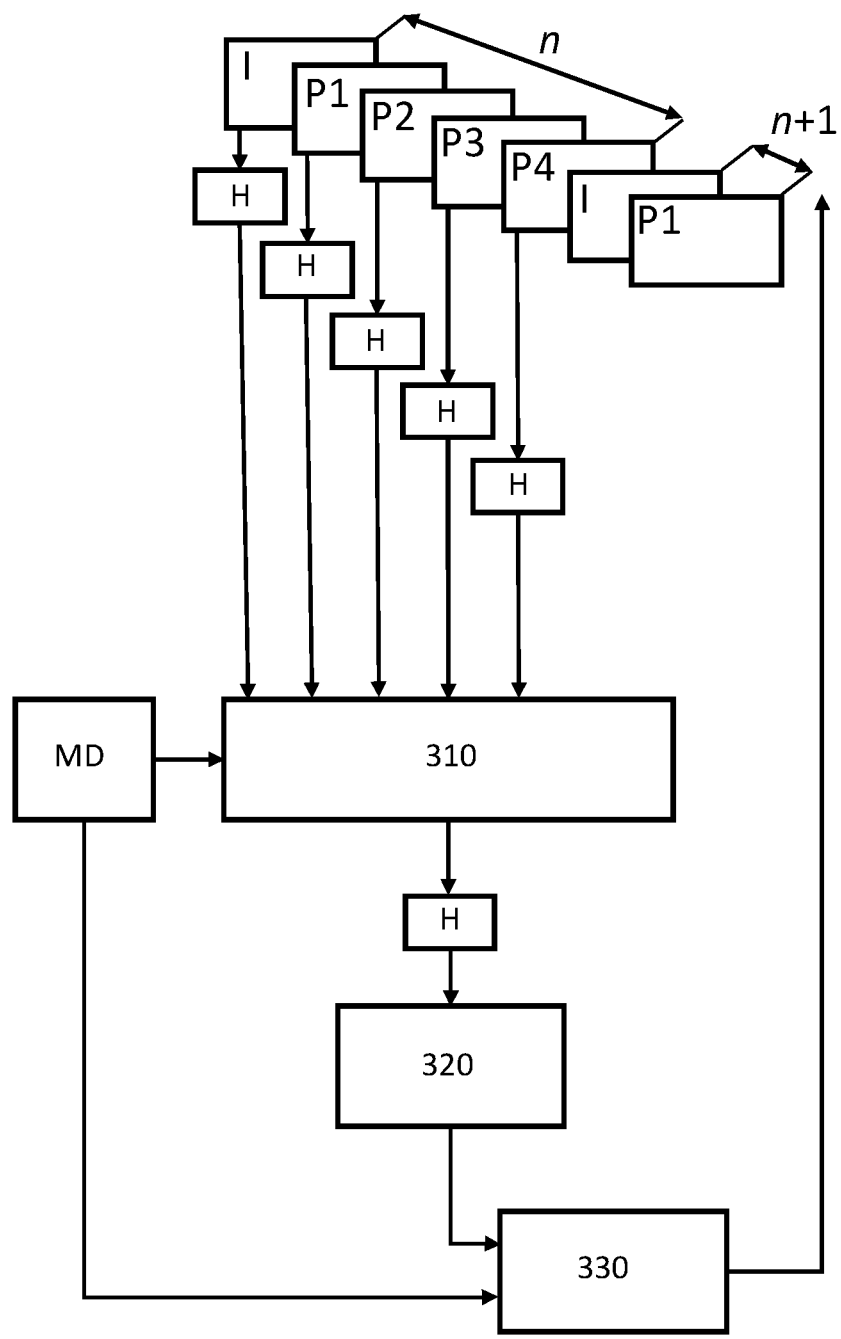
FIG. 3B shows an illustration of signing a last GOP of a video segment according to embodiments of a method of the present disclosure.

Turning to FIG. 3B, the GOP hash for the GOP n may be based on frame hashes for the frames I, P1-P4 of the GOP i. For example, producing the GOP hash for the GOP n, may comprise producing a frame hash, using a hash function H, for each frame I, P1-P4 for the GOP n. The frame hashes for each of the frames I, P1-P4 may then be concatenated 310 and in turn hashed, using a hash function H, to produce the GOP hash for the GOP n. Optionally, metadata MD may also be concatenated 310 with the frame hashes for each of the frames I, P1-P4 to produce the GOP hash for the GOP n. The metadata MD may comprise at least one of a unique identifier of a camera capturing the video segment, a time stamp for the video segment, a hardware type (camera type), a firmware version a GPS position, a frame stamp, and a number of boots. The GOP hash is then signed 320 using any type of digital signature enabling verification of origin of the GOP, e.g., using encryption of the GOP hash by means of a private key of a public/private key pair of a device, such as a camera, in which the method is performed. For examples, RSA (Rivest-Shamir-Adleman) 256-bit encryption, the Digital Signature Algorithm (DSA) and the Elliptic Curve Digital Signing Algorithm (ECDSA) may be used for digitally signing the GOP hash.

By producing the GOP hash for the GOP n using hashing of a concatenation of the one or more frame hashes for the frames I, P1-P4 of the GOP n, with or without the metadata MD, and then digitally signing 320 the GOP hash, verification that the content of the GOP n is intact, i.e., is untampered, can be made on a GOP level. In alternative, the one or more frame hashes for the frames I, P1-P4 of the GOP n may be concatenated (not shown in FIG. 3B) with the GOP hash for the GOP n to produce a concatenated GOP hash for the GOP n, and then the concatenated GOP hash is digitally signed 320 by means of a digital signature to produce a signed GOP hash. In this alternative, the part of the signed GOP hash relating to the GOP hash can be used to verify that the content of the GOP is intact, i.e., is untampered, on a GOP level. If it shown that the GOP is not intact, the part of the signed GOP hash relating to the concatenated one or more frame hashes can be used to identify which frame of the one or more frame hashes has been tampered with by comparison to frame hashes produced from the content of the frames of the GOP at the decoder side.

Furthermore, a frame hash for the first frame I of the subsequent GOP i+1 may also be produced and added to the GOP hash for the GOP i before signing in order to enable identification of reordering of the GOPs and undetectable cuts. In alternative the GOP hash for the GOP i may be produced by hashing a concatenation of the frame hashes for the frames of the GOP i and the frame hash for the first frame I of the subsequent GOP i+1.

Figure 4:
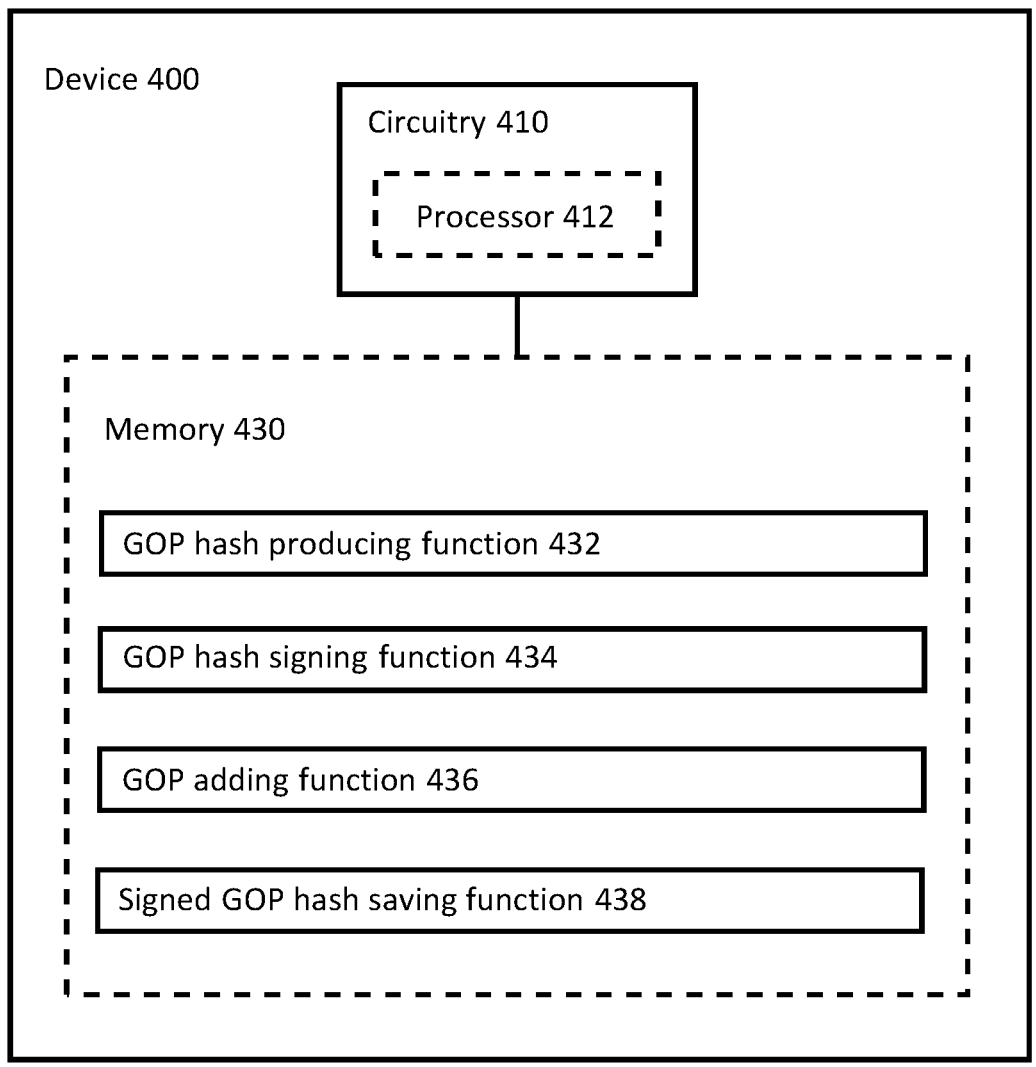
FIG. 4 shows a schematic diagram in relation to embodiments of a device of the present disclosure for signing a video segment comprising one or more GOPs.

FIG. 4 shows a schematic diagram in relation to embodiments of a device 400 of the present disclosure for signing a video segment comprising one or more groups of pictures, GOPs, each GOP comprising a header and one or more frames. The device 400 may be a camera, such as for example a surveillance camera or a body worn camera. The device 400 comprises circuitry 410. The circuitry 410 is configured to carry out the functions 432, 434, 436, 438 of the device 400. The circuitry 410 may include a processor 412, such as a central processing unit (CPU), microcontroller, or microprocessor. The processor 412 is configured to execute program code. The program code may for example be configured to carry out the functions 432, 434, 436, 438 of the device 400.

The device 400 may further comprise a memory 430. The memory 430 may be one or more of a buffer, a flash memory, a hard drive, a removable media, a volatile memory, a non-volatile memory, a random access memory (RAM), or another suitable device. In a typical arrangement, the memory 430 may include a non-volatile memory for long term data storage and a volatile memory that functions as system memory for the circuitry 410. The memory 430 may exchange data with the circuitry 410 over a data bus. Accompanying control lines and an address bus between the memory 430 and the circuitry 410 also may be present.

The functions 432, 434, 436, 438 of the device 400 may be embodied in the form of executable logic routines (e.g., lines of code, software programs, etc.) that are stored on a non-transitory computer readable medium (memory) 430 of the device 400 and are executed by the circuitry 410, e.g., using the processor 412 in the circuitry 410. Furthermore, the functions 432, 434, 436, 438 of the device 400 may be a stand-alone software application or form a part of a software application. The described functions may be considered a method that a processing unit, e.g., the processor 412 of the circuitry 410 is configured to carry out. Also, while the described functions 432, 434, 436, 438 may be implemented in software, such functionality may as well be carried out via dedicated hardware or firmware, or some combination of hardware, firmware and/or software.

The circuitry 410 is configured to execute a GOP hash producing function configured to produce a GOP hash for each GOP of the GOPs of the one or more GOPs.

The circuitry 410 is further configured to execute a GOP hash signing function configured to digitally sign the GOP hash for each GOP of the GOPs of the one or more GOPs, thereby producing a respective signed GOP hash for each GOP of the GOPs of the one or more GOPs.

The circuitry 410 is further configured to execute a GOP adding function configured to add an additional GOP to the video segment after the last GOP of the one or more GOPs, the additional GOP comprising a header and one or more frames.

The circuitry 410 is further configured to execute a signed GOP hash saving function configured to, for each GOP of the one or more GOPs, save the respective signed GOP hash in the header of a subsequent GOP, wherein the signed GOP hash for the last GOP of the one or more GOPs is saved in the header of the additional GOP.

The device 400 and the functions 432, 434, 436, 438 carried out by the circuitry 410 may be further adapted as the method 200 and the corresponding steps of the method 200 described in relation to FIGS. 1, 2, 3A and 3B respectively.

The device 400 may further comprise an encoder (not shown) for encoding the frames of the GOPs of the video segment including the one or more frames of the additional GOP.

A person skilled in the art realizes that the present disclosure is not limited to the embodiments described above. On the contrary, many modifications and variations are possible within the scope of the appended claims. Such modifications and variations can be understood and effected by a skilled person in practicing the claimed disclosure, from a study of the drawings, the disclosure, and the appended claims.

The invention claimed is:

1. A method of signing a video segment comprising one or more groups of pictures, GOPs, each GOP comprising a header and one or more encoded frames, the method comprising:
for each GOP of the one or more GOPs:
producing a GOP hash; and
digitally signing the GOP hash by means of a digital signature, thereby producing a signed GOP hash;
for each GOP except a last GOP of the one or more GOPs, refraining from saving the respective signed GOP hash in any portion of the respective GOP, including the header of the respective GOP, and instead saving the respective signed GOP hash in the header of a subsequent GOP;
adding an additional GOP to the video segment after the last GOP of the one or more GOPs, the additional GOP comprising a header and one or more encoded frames; and
saving the signed GOP hash of the last GOP of the one or more GOPs in the header of the additional GOP.

2. The method according to claim 1, wherein the additional GOP comprises an empty intra frame and zero or more empty inter frames.

3. The method according to claim 1, wherein the additional GOP includes information indicating that the additional GOP is a last GOP of the video segment.

4. The method according to claim 1, wherein producing a GOP hash comprises:
for each encoded frame of the one or more encoded frames of the GOP, producing a frame hash, thereby producing one or more frame hashes; and
hashing the one or more frame hashes, thereby producing the GOP hash.

5. The method of claim 4, wherein producing the GOP hash further comprises hashing the one or more frame hashes with metadata comprising at least one of a unique identifier of a camera capturing the video segment and a time stamp for the video segment, thereby producing the GOP hash.

6. The method of claim 4, further comprising concatenating the one or more frame hashes with the GOP hash, thereby producing a concatenated GOP hash, and wherein digitally signing the GOP hash further comprises signing the concatenated GOP hash by means of a digital signature, thereby producing a signed GOP hash.

7. A non-transitory computer readable storage medium having stored thereon instructions for signing a video segment comprising one or more groups of pictures, GOPs, each GOP comprising a header and one or more encoded frame, such that when the instructions are executed on a processor the processor is configured to:
for each GOP of the one or more GOPs:
producing a GOP hash; and
digitally signing the GOP hash by means of a digital signature, thereby producing a signed GOP hash:
for each GOP except a last GOP of the one or more GOPs, refraining from saving the respective signed GOP hash in any portion of the respective GOP, including the header of the respective GOP, and instead saving the respective signed GOP hash in the header of a subsequent GOP;
add an additional GOP to the video segment after the last GOP of the one or more GOPs, the additional GOP comprising a header and one or more encoded frames, and
save the signed GOP hash of the last GOP of the one or more GOPs in the header of the additional GOP.

8. A device for signing a video segment comprising one or more groups of pictures, GOPs, each GOP comprising a header and one or more encoded frames, the device comprising circuitry configured to execute:
a GOP hash producing function configured to produce a GOP hash for each GOP of the GOPs of the one or more GOPs; and
a GOP hash signing function configured to digitally sign the GOP hash for each GOP of the GOPs of the one or more GOPs, thereby producing a respective signed GOP hash for each GOP of the GOPs of the one or more GOPs;
a GOP adding function configured to add an additional GOP to the video segment after the last GOP of the one or more GOPs, the additional GOP comprising a header and one or more encoded frames; and
a signed GOP hash saving function configured to, for each GOP of the one or more GOPs, refraining from saving the respective signed GOP hash in any portion of the respective GOP, including the header of the respective GOP, and instead save the respective signed GOP hash in the header of a subsequent GOP, wherein the signed GOP hash for the last GOP of the one or more GOPs is saved in the header of the additional GOP.

9. The device according to claim 8, wherein the additional GOP comprises an empty intra frame and zero or more empty inter frames.

10. The device according to claim 8, wherein the additional GOP includes information indicating that the additional GOP is a last GOP of the video segment.

11. The device according to claim 8, wherein the GOP hash producing function is configured to produce a GOP hash by:
producing a frame hash for each encoded frame of the one or more encoded frames of the GOP, thereby producing one or more frame hashes; and
hashing the one or more frame hashes, thereby producing the GOP hash.

12. The device of claim 11, wherein producing the GOP hash further comprises hashing the one or more frame hashes with metadata comprising at least one of a unique identifier of a camera capturing the video segment and a time stamp for the video segment, thereby producing the GOP hash.

13. The device of claim 11, further comprising
concatenating the one or more frame hashes with the GOP hash, thereby producing a concatenated GOP hash, and wherein digitally signing the GOP hash further comprises signing the concatenated GOP hash by means of a digital signature, thereby producing a signed GOP hash.

14. The non-transitory computer readable storage medium according to claim 7, wherein the additional GOP comprises an empty intra frame and zero or more empty inter frames.

15. The non-transitory computer readable storage medium according to claim 7, wherein the additional GOP includes information indicating, that the additional GOP is a last GOP of the video segment.

16. The non-transitory computer readable storage medium according to claim 7, wherein producing a GOP hash comprises:
for each encoded frame of the one or more encoded frames of the GOP, producing a frame hash, thereby producing one or more frame hashes; and
hashing the one or more frame hashes, thereby producing the GOP hash.

17. The non-transitory computer readable storage medium according to claim 16, wherein producing the GOP hash further comprises hashing the one or more frame hashes with metadata comprising at least one of: a unique identifier of a camera capturing the video segment, and a time stamp for the video segment, thereby producing the GOP hash.

18. The non-transitory computer readable storage medium according to claim 16, wherein the processor is further configured to:
concatenate the one or more frame hashes with the GOP hash, thereby producing a concatenated GOP hash, and
wherein digitally signing the GOP hash further comprises signing the concatenated GOP hash by means of a digital signature, thereby producing a signed GOP hash.

19. The non-transitory computer readable storage medium according to claim 7, wherein the additional GOP comprises an empty intra frame and one or more empty inter frames.

* * * * *